United States Patent
Yamaguchi

(10) Patent No.: US 9,190,913 B2
(45) Date of Patent: Nov. 17, 2015

(54) POWER SOURCE DEVICE AND IMAGE FORMING APPARATUS

(71) Applicant: CANON KABUSHIKI KAISHA, Tokyo (JP)

(72) Inventor: Tsuyoshi Yamaguchi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 333 days.

(21) Appl. No.: 13/777,530

(22) Filed: Feb. 26, 2013

(65) Prior Publication Data

US 2013/0236204 A1  Sep. 12, 2013

(30) Foreign Application Priority Data

Mar. 9, 2012 (JP) ................. 2012-053526

(51) Int. Cl.
  *H02M 3/335* (2006.01)
  *G03G 15/00* (2006.01)
  *G05F 3/06* (2006.01)
  *H02M 1/00* (2007.01)

(52) U.S. Cl.
  CPC ....... *H02M 3/33507* (2013.01); *G03G 15/5004* (2013.01); *G03G 15/80* (2013.01); *H02M 2001/0035* (2013.01); *Y02B 70/16* (2013.01)

(58) Field of Classification Search
  USPC ......................................... 307/151
  See application file for complete search history.

(56) References Cited

U.S. PATENT DOCUMENTS 8,410,768 B2 * 4/2013 Huber et al. ................ 323/284
2010/0067043 A1 * 3/2010 Sasaki ........................ 358/1.15

FOREIGN PATENT DOCUMENTS

JP     4415052    2/2010

* cited by examiner

*Primary Examiner* — Robert Deberadinis
(74) *Attorney, Agent, or Firm* — Fitzpatrick, Cella, Harper & Scinto

(57) ABSTRACT

A power source device includes: a transformer; a switching section driving a primary side of the transformer; and a controller capable of performing a switching operation on driving of the switching section for controlling an output of a secondary side of the transformer. The device detects a drive frequency for the switching section in the switching operation, and switches the drive frequency so as not to be a frequency in a prescribed range when the detected drive frequency reaches a threshold.

12 Claims, 10 Drawing Sheets

POWER SOURCE DEVICE AND IMAGE FORMING APPARATUS

BACKGROUND OF THE INVENTION

1. Field of the Invention

The present invention relates to a power source device that avoids causing vibration noise of a transformer under a light load, and an image forming apparatus including the power source device.

2. Description of the Related Art

Recently, energy saving products have been desired for devices. In particular, it has been desired to reduce standby power consumption, which is consumed in a state of connection to an outlet even without use in a normal operation. In a switching power source, typified by a flyback system, loss due to switching of a switching element accounts for most of the power consumption during waiting or under light load. As a scheme for solving this problem, a configuration is known that performs an intermittent operation where a switching interval under light load is longer than that in a continuous switching operation under normal load to reduce switching times per unit time, thereby reducing switching loss. According to Japanese Patent No. 4,415,052, further reduction in power consumption during waiting is realized by switching a resistor connected to an oscillator circuit frequency adjusting terminal of a power source IC in response to an external signal indicating that an apparatus enters a waiting mode to further increase the period of an intermittent switching operation.

However, the conventional technique has a possibility that the vibration frequency of a flyback transformer vibrating according to the intermittent period is low during an intermittent switching operation and is thus in a human audible range to thereby cause beat sound (vibration noise) of the transformer. In a light load state, the apparatus does not perform the normal operation and stays silent; the situation makes beat sound of the transformer further noticeable. Accordingly, measures against the beat sound in the light load state are required to be taken. To avoid the beat sound of the transformer with the conventional configuration, an operation with a vibration frequency exceeding the audible range can be considered. In this case, switching times increase. Accordingly, switching loss increases, in turn, increasing power consumption.

In Japanese Patent No. 4,415,052, the intermittent switching period is switched in response to an external signal indicating that a light load mode is entered. Accordingly, in an apparatus that has an individual difference in intermittent period due to components or substrates and has a plurality of power modes, it is difficult to take measures against beat sound of the transformer that occurs in the case where the vibration frequency of the transformer is low.

SUMMARY OF THE INVENTION

The present invention is made in such situations, and can avoid causing vibration noise of a transformer occurring in a switching operation while reducing loss due to a switching operation of a switching element.

A power source device of the present invention includes: a transformer; a switching section driving a primary side of the transformer; a controller capable of performing a switching operation including a time period for driving the switching section and a time period for suspending the switching section, to control an output from a secondary side of the transformer; a detector detecting a drive frequency for the switching section in the switching operation; and a frequency switch switching the drive frequency so as not to be a frequency in a prescribed range, when the drive frequency detected by the detector reaches a threshold.

An image forming apparatus of the present invention includes: a controller controlling an image forming operation; and a power source supplying power to the controller, the power source comprising: a transformer; a switching section driving a primary side of the transformer; a controller capable of performing a switching operation including a time period for driving the switching section and a time period for suspending the switching section, to control an output from a secondary side of the transformer; a detector detecting a drive frequency for the switching section in the switching operation; and a frequency switch switching the drive frequency so as not to be a frequency in a prescribed range, when the drive frequency detected by the detector reaches a threshold.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings.

(Configurations of Power Source Device of Comparative Example for Comparison with Embodiments of the Present Invention)

Figure 7:
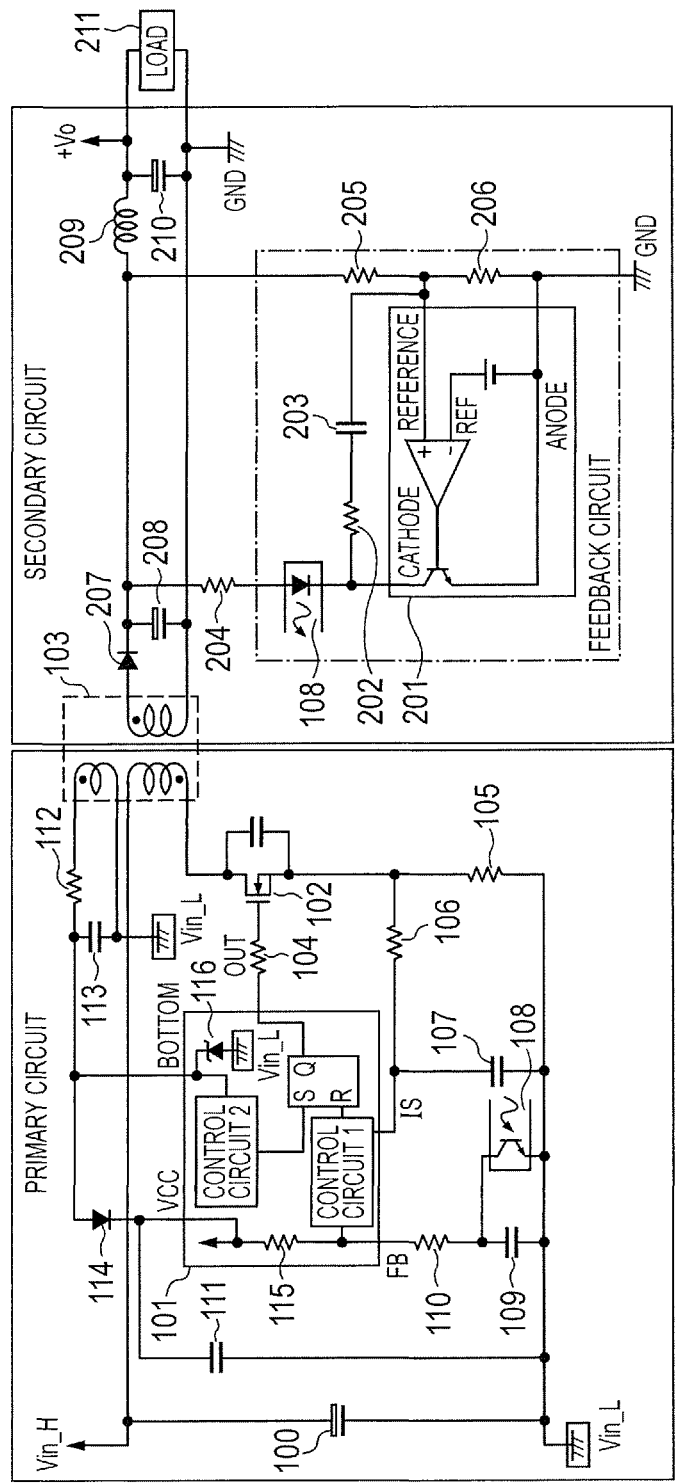
FIG. 7 is a schematic circuit diagram of a power source device of a comparative example.

To clarify the characteristics of power source devices of after-mentioned Examples 1 to 3, a configuration and an operation of a power source device of a comparative example is described using FIG. 7. In the power source device in the diagram, a transformer for a flyback power source (hereinafter, simply called transformer) 103 insulates primary and secondary sides from each other. The primary side of the power source device includes a switching FET 102 that intermittently interrupts power supply by turning on and off, a diode 114 that rectifies and smoothes a voltage induced by auxiliary windings of the transformer 103, and a capacitor 111. The primary side of the power source device further includes: an RC filter circuit including a resistor 112 for limiting inrush current to the capacitor 111, and a capacitor 113; and a power source IC 101 driving and controlling the switching FET 102. The power source IC 101 includes a control circuit 1, a control circuit 2, an SR flip-flop circuit, an FB current limiting resistor 115 in the IC, and the like. The primary side of the power source device further includes a gate resistor 104 for the switching FET 102, a photocoupler 108 and a capacitor 109 for inputting a signal from a feedback circuit of the secondary side into the power source IC 101, and a current limiting resistor 110. The primary side of the power source device further includes a current detecting resistor 105 for converting a primary current into a voltage. The primary side of the power source device further includes a resistor 106 of an RC filter configured on a line connecting the current detecting resistor 105 to the current detecting terminal IS of the power source IC 101, and a capacitor 107. Commercial alternating current power supply is input into Vin_H and Vin_L. A full-wave rectified voltage is applied through a rectification diode bridge, not illustrated, and charged as direct-current voltage to a primary smoothing electrolytic capacitor 100.

The secondary side of the power source device includes a diode 207 for rectifying a secondary output of the transformer 103, an electrolytic capacitor 208 for storing a secondary power, and a coil 209 and an electrolytic capacitor 210 for further rectifying and smoothing a voltage after the diode 207. The voltage after the diode 207 is rectified and smoothed by the coil 209 and the electrolytic capacitor 210 to thereby acquire a prescribed voltage (+Vo). The secondary side of the power source device further includes an upper voltage-dividing resistor 205 and a lower voltage-dividing resistor 206 that are for generating a comparative voltage from the output voltage, and a regulator IC 201 that is for a reference voltage for the feedback circuit and serves as a differential amplifier circuit. The secondary side of the power source device further includes a phase compensation circuit of the regulator IC 201 which includes a resistor 202 and a capacitor 203, and a resistor 204 for detecting secondary current. A load 211 is connected to the power source device.

(Feedback Circuit)

A schematic operation of a circuit configuration of the comparative example is described hereinafter. First, the feedback circuit (the alternate long and short dash line part in FIG. 7) of the secondary side of the power source device is described. The feedback circuit compares a comparative voltage (REFERENCE), in proportion to the output voltage generated by the upper voltage-dividing resistor 205 and the lower voltage-dividing resistor 206, with a reference voltage REF of the regulator IC 201. The regulator IC 201 amplifies the potential difference between the compared voltages, and drives a transistor in the regulator IC 201, thereby causing current to flow between the cathode and anode of the regulator IC 201 (hereinafter, called "between CATHODE-ANODE"). That is, current in proportion to the potential difference between the comparative voltage and the reference voltage flows from the output voltage to between CATHODE-ANODE of regulator IC 201 through the photocoupler 108.

(Circuit Operation Under Normal Load)

Figure 8A:
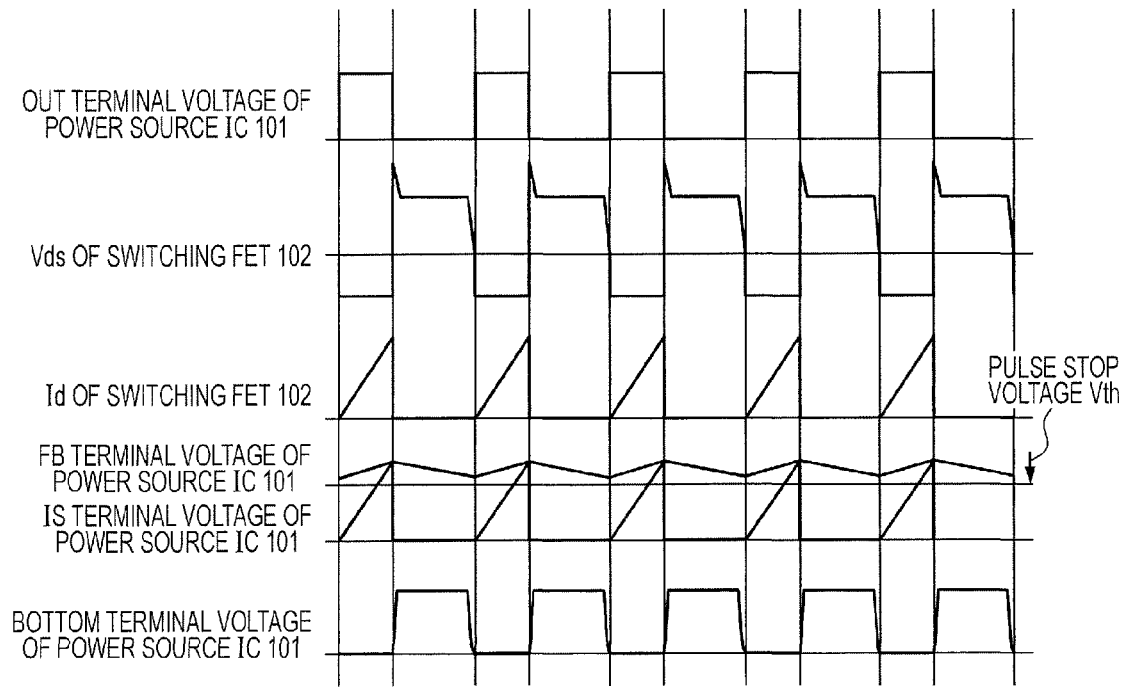
FIG. 8A illustrates a continuous switching operation waveform under normal load on a secondary side in the power source device of the comparative example.

Next, a circuit operation of the primary circuit is described. FIG. 8A illustrates a basic operation waveform of the primary circuit under a secondary normal load. FIG. 8A illustrates the waveforms of OUT terminal voltage of the power source IC 101, Vds of the switching FET 102, Id of the switching FET 102, FB terminal voltage of the power source IC 101, IS terminal voltage of the power source IC 101, and BOTTOM terminal voltage of the power source IC 101 in this order from the top. The waveform of voltage output from the OUT terminal of the power source IC 101 is that of a pulse wave. When the voltage is changed to a high level (Hi), the switching FET 102 is driven (turned (ON)). At this time, current, such as the drain current Id of switching FET 102 illustrated in FIG. 8A, flows from Vin_H toward Vin_L through the line of the primary windings of the transformer 103, the switching FET 102, the current detecting resistor 105 on the primary side. At this time, the transformer 103 stores energy owing to a magnetic flux caused by current flowing through the primary windings.

A voltage that is converted by the current detecting resistor 105 on the primary side and in proportion to the drain current Id of the switching FET 102 is input into the IS terminal of the power source IC 101. At a time when the voltage input into the IS terminal of the power source IC 101 (IS terminal voltage) becomes equal to the FB terminal voltage of the power source IC 101, the OUT terminal voltage of the power source IC 101 is changed to a low level (Lo) and the switching FET 102 is turned off. Here, turning off the switching FET 102 causes an induced electromotive force in response to the counter electromotive force on the primary side, at the secondary windings of the transformer 103, thereby releasing the energy stored in the core.

The FB terminal voltage of the power source IC 101 is changed in response to the FB terminal current released from the power source IC 101 and the operations of the secondary feedback circuit and the photocoupler 108. As the output voltage of the power source device decreases, the current Ic flowing to the transistor of the photocoupler 108 decreases, the capacitor 109 is charged by an internal power source of the power source IC 101, and the FB terminal voltage increases. In contrast, as the output voltage of the power source device increases, the current Ic flowing to the transistor of the photocoupler 108 increases and the FB terminal voltage decreases. Accordingly, as the switching FET 102 is turned off and the energy stored in the core from the secondary windings of the transformer 103 is released, the output voltage increases and the voltage of the FB terminal of the power source IC 101 decreases in response thereto.

Unlike the turns ratio of the primary windings and the secondary windings, the turns ratio of the primary windings and the auxiliary windings of the transformer 103 is set such that a VCC voltage required for the power source IC 101 can be acquired. Also at the auxiliary windings, an induced electromotive force occurs according to the counter electromotive force on the primary side, and a voltage in proportion to the secondary windings appears. The power source IC 101 inputs the auxiliary windings voltage clamped by a Zener diode 116 in the IC and the capacitor 113, into the BOTTOM terminal, thereby detecting that energy release from the secondary windings of the transformer 103 is finished. When the energy release from the secondary windings of the transformer 103 is finished, i.e., the voltage of the BOTTOM terminal is changed to the low level, the voltage of the OUT terminal of the power source IC 101 is changed to the high level again and the above mentioned series of operations is repeated.

A period during which the OUT terminal of the power source IC 101 is at a high level, i.e., on duty, in the series of operations is determined according to the difference between the FB terminal voltage of the power source IC 101 and the reference voltage in the power source IC (pulse stop voltage Vth (see FIG. 8A)). The higher the FB terminal voltage of the power source IC 101, the longer the on duty of the voltage of the OUT terminal of the power source IC 101 becomes. Meanwhile, when the FB terminal voltage falls below the pulse stop voltage Vth, the power source IC 101 changes the OUT terminal voltage to the low level and turns off the switching FET 102. The circuit operation under the normal load has thus been described.

(Circuit Operation in Light Load Intermittent Operation)

Figure 8B:
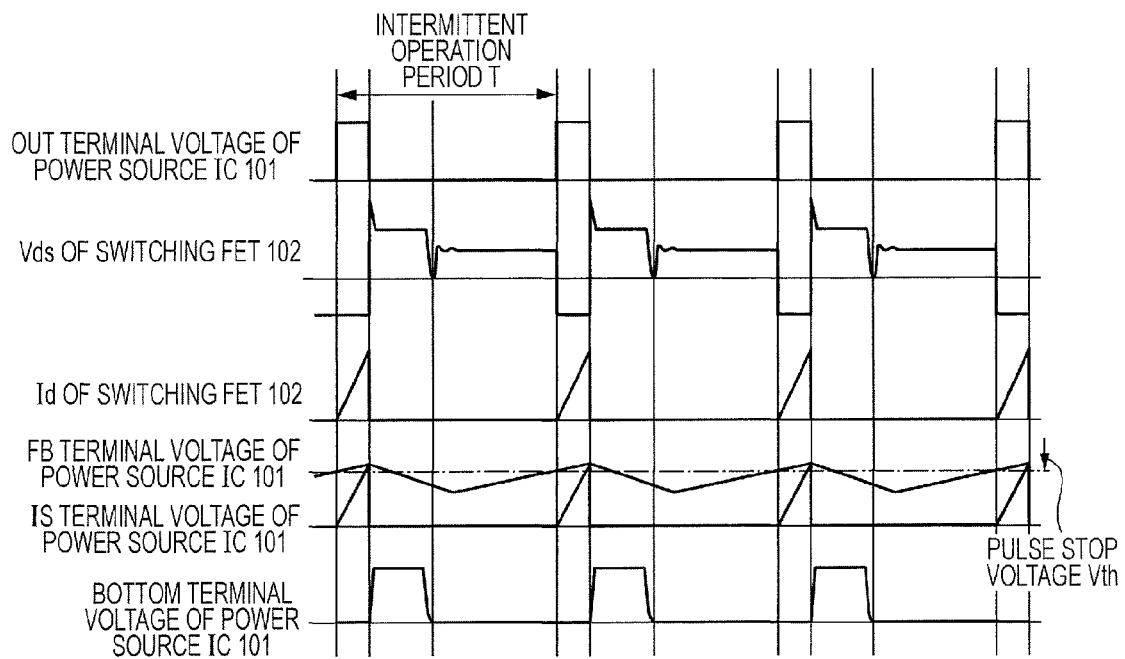
FIG. 8B illustrates an intermittent switching operation waveform under light load on the secondary side in the comparative example.

Next, an operation in a light load intermittent operation with reduced switching times is described. FIG. 8B illustrates the operation waveform on the primary side when the secondary side is under the light load in the comparative example. In order from the top, FIG. 8B illustrates the waveforms similar to those in FIG. 8A. As described above, the trigger of turning on the switching FET 102 corresponds to a time when the BOTTOM terminal of the power source IC 101 is changed to the low level and the voltage of the FB terminal becomes higher than the pulse stop voltage Vth.

Under the normal load, as illustrated in FIG. 8A, the FB terminal voltage is always higher than the pulse stop voltage Vth. Accordingly, the switching FET 102 is turned on at a time when the BOTTOM terminal voltage is reduced to the reference voltage or less. In contrast, under the light load, the voltage of the FB terminal is low, and the FB terminal voltage is reduced less than the pulse stop voltage Vth while the energy stored in the transformer 103 is being released as flyback current to the secondary side. Thus, until the FB terminal voltage becomes higher than the pulse stop voltage Vth after release of the flyback current, the switching FET 102 cannot be turned on. Accordingly, under the light load, the intermittent operation as illustrated in FIG. 8B is performed. As described above, the switching operation of the switching FET 102 is suspended during a period in which the FB terminal voltage is lower than the pulse stop voltage Vth.

(Relationship Between Transformer Vibration Frequency and Secondary Load Current in Comparative Example)

Figure 9A:
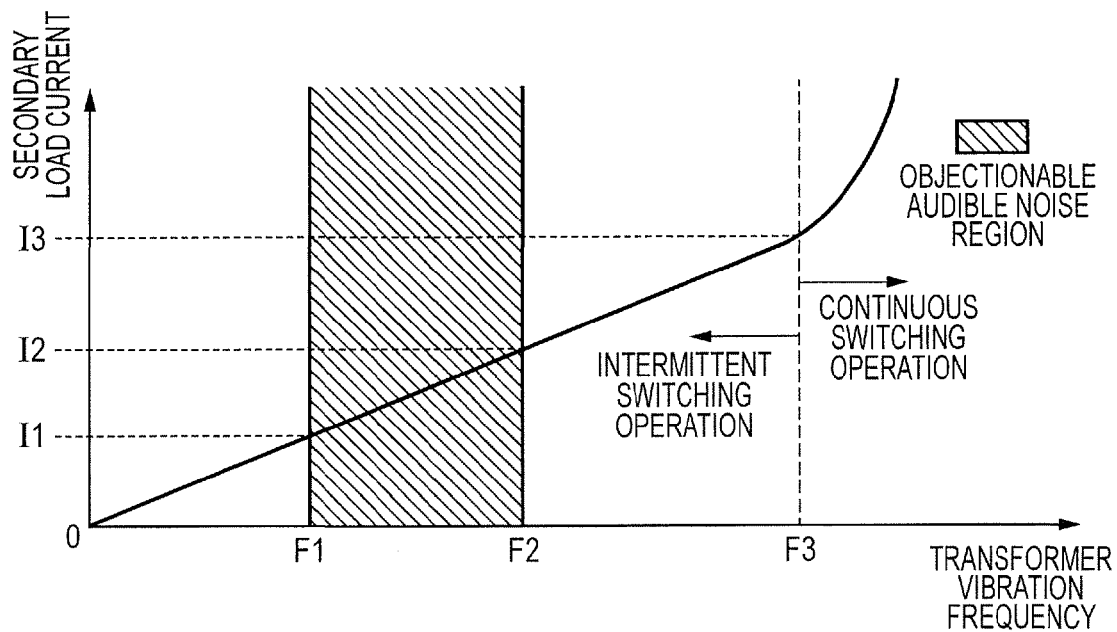
FIG. 9A is a graph of a relationship between the transformer vibration frequency and secondary load current of the power source device of the comparative example.

FIG. 9A is a schematic diagram of the relationship between the secondary load current and the transformer vibration frequency in the circuit configuration of the comparative example. In FIG. 9A, the abscissa represents the transformer vibration frequency (Hz), and the ordinate represents the secondary load current A. In the case where the secondary load current is higher than a current I3 in the diagram, the circuit operation under the normal load is performed, that is, the continuous switching operation illustrated in FIG. 8A is performed. In the case where the secondary load current is a light load lower than the load current I3, the light load intermittent operation (also called an intermittent switching operation) illustrated in FIG. 8B is performed. A transformer vibration frequency F3 of the transformer 103 corresponds to the secondary load current I3. In the case of the continuous switching operation, the vibration frequency of the transformer 103 is determined by a continuous switching period. In contrast, in the case of the intermittent switching operation, the vibration frequency is determined by a frequency according to an intermittent operation period T (also called as an intermittent switching period) illustrated in FIG. 8B. The higher the load current on the secondary side, the higher the vibration frequency of the transformer 103 becomes. A low frequency region between F1 and F2 of the transformer vibration frequencies in the diagram (the hatched part in the diagram) (in a prescribed range) is a frequency region where the transformer 103 causes beat sound (vibration noise) (described as an objectionable audible noise region in the diagram). In the circuit configuration of the comparative example, in the case of performing the intermittent switching operation according to a transformer vibration frequency between F1 and F2, the transformer 103 causes beat sound in a load region between secondary load current I1 and secondary load current I2 according to the vibration frequency between F1 and F2. Embodiments of the present invention, which solve such a problem, is described hereinafter based on Examples.

Example 1

Figure 1:
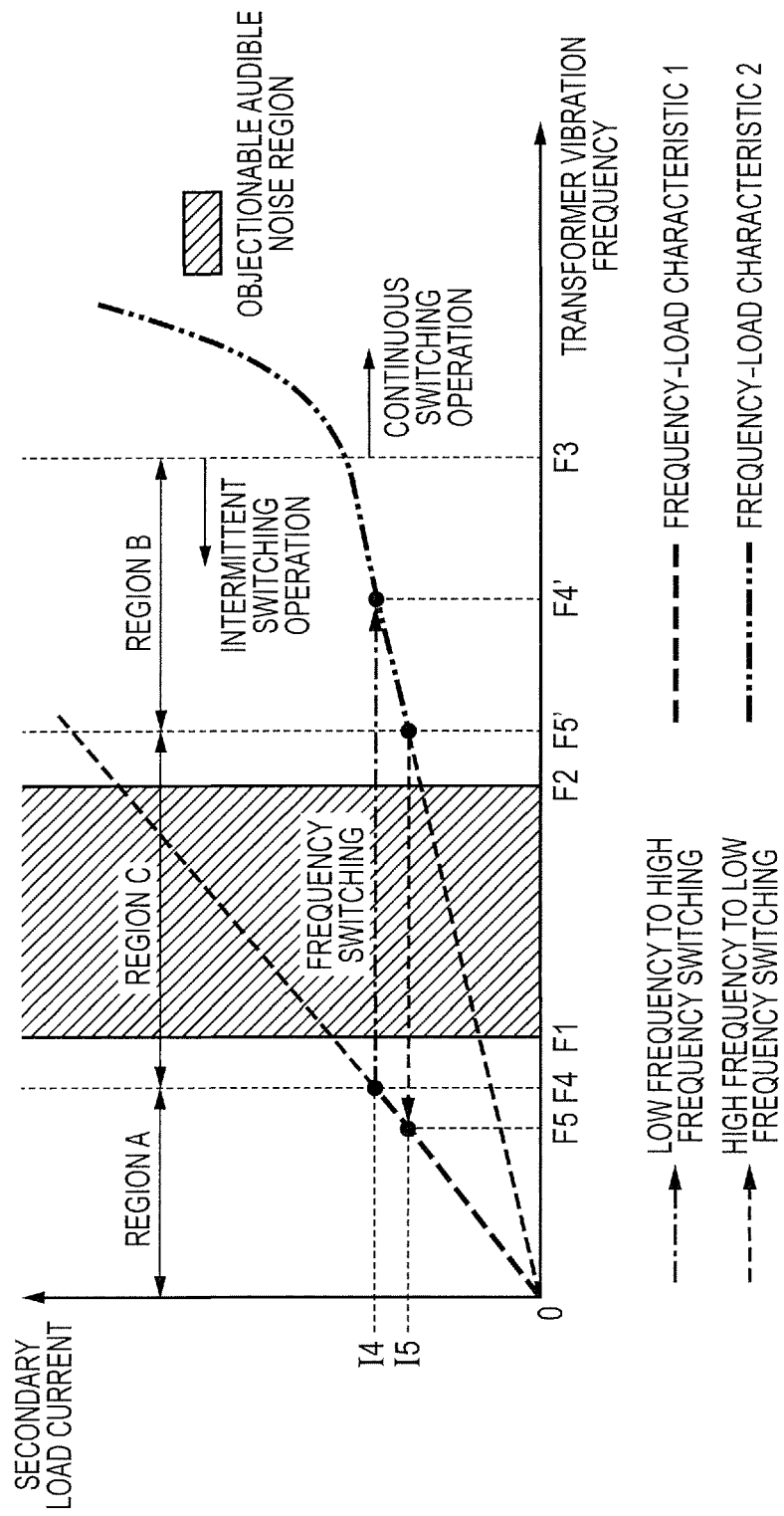
FIG. 1 is a graph representing a relationship between the transformer vibration frequency and secondary load current of Examples 1 to 3.

According to Example 1, in the intermittent switching operation, the transformer vibration frequencies between F1 and F2 are avoided, and the intermittent operation is not performed in a specified intermittent switching period. FIG. 1 illustrates the relationship between the secondary load current and the transformer vibration frequency in this example. Description on parts in FIG. 1 assigned with symbols used in FIG. 9A are omitted. In this example, as illustrated in the diagram, two characteristics are included between the transformer vibration frequency and the secondary load current. In the case of increasing the load from a state where the transformer vibration frequency is low and the load on the secondary side is smaller than I4, i.e., in a region A, the intermittent switching operation is performed using a frequency-load characteristic 1 (thick broken line) in the diagram. When the transformer vibration frequency reaches the transformer vibration frequency F4 immediately before the transformer vibration frequency F1 where beat sound occurs, the switching operation is switched so as to use a frequency-load characteristic 2 (thick alternate long and two short dashes line). In FIG. 1, switching from the frequency-load characteristic 1 to the frequency-load characteristic 2, i.e., switching (frequency switching) from the low frequency (low-frequency wave) F4 to the high frequency (high-frequency wave) F4' is represented by an alternate long and short dash line arrow. Thus, in this example, transition occurs from the region A to the region B in FIG. 1. The intermittent operation according to the transformer vibration frequency equal to or higher than the vibration frequency F4' is then performed.

Meanwhile, in the case of reducing the load from a state where the transformer vibration frequency is high and the secondary load is larger than I5, i.e., in the region B, the switching operation is performed using the frequency-load characteristic 2 in the diagram. When the transformer vibration frequency reaches a transformer vibration frequency F5' immediately before the transformer vibration frequency F2 where beat sound occurs, the switching operation is switched so as to use the frequency-load characteristic 1. In FIG. 1, switching from the frequency-load characteristic 2 to the frequency-load characteristic 1, i.e., switching (frequency switching) from the high frequency (high-frequency wave) F5' to the low frequency (low-frequency wave) F5 is represented by a broken line arrow. In this example, transition occurs from the region B to the region A in FIG. 1. The intermittent switching operation according to the transformer vibration frequency equal to or lower than the transformer vibration frequency F5 is then performed. Switching between the two frequency-load characteristics is performed, and the switching operation is not performed in a region C including the transformer vibration frequency region between F1 and F2, thereby avoiding occurrence of beat sound in the transformer 103 in the light load intermittent switching operation.

As described above, hysteresis characteristics are included between the secondary load and the vibration frequency before and after switching the transformer vibration frequency, thereby preventing oscillation before and after switching the transformer vibration frequency due to variation in load on the secondary side. Furthermore, the value of I4/F4, which determines a slope of the frequency-load characteristic 1 used at a transformer vibration frequency equal to or less than the transformer vibration frequency F4, is set to be sufficiently larger than the value of I5/F5' which is a slope of the frequency-load characteristic 2. Accordingly, the switching times of the switching FET 102 in the low frequency region is reduced, and energy loss due to switching can be reduced.

Figure 9B:
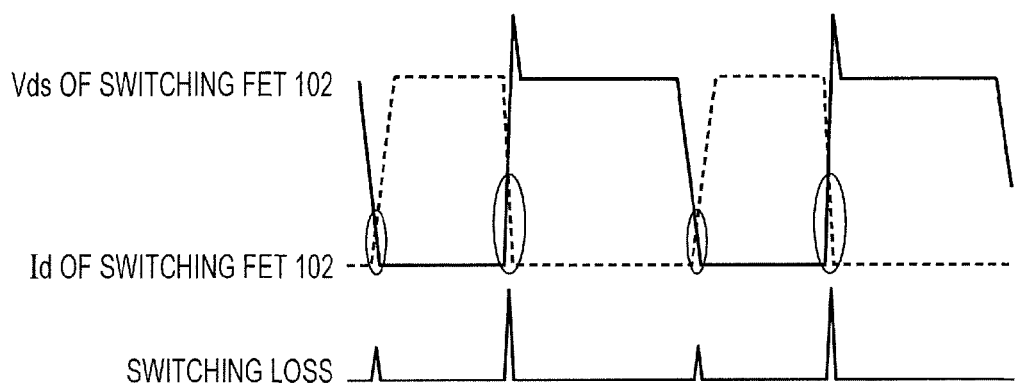
FIG. 9B is a schematic diagram of typical switching loss.

FIG. 9B illustrates typical waveforms for describing the switching loss. FIG. 9B illustrates a typical Vds (solid line) of the switching FET 102, Id (broken line), and switching loss in this order from the top. The switching loss is a loss caused on switching by the switching FET 102. The switching loss indicates a power acquired by multiplying the voltage Vds between the drain and source by the drain current Id on the switching operation of the switching FET 102, and is represented by the intersections between the two waveforms encircled by ellipses in FIG. 9B. It can be understood from FIG. 9B that as the number of switching operations per unit time in the switching operations is reduced, the number of occurrence of switching loss is reduced and the switching loss is reduced.

(Configuration of Power Source Device)

Figure 2:
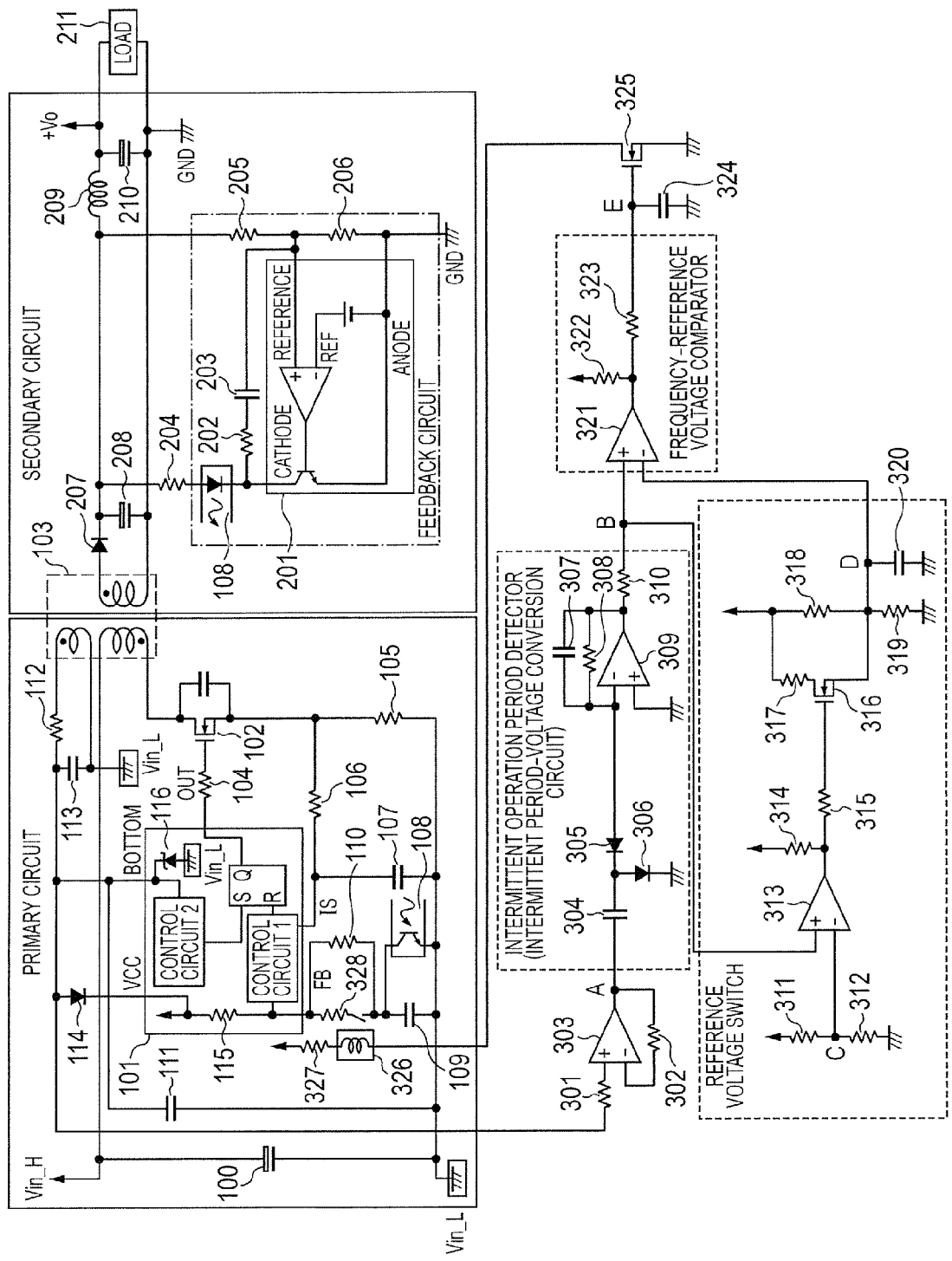
FIG. 2 is a schematic circuit diagram of a power source device of Example 1.

FIG. 2 is a schematic circuit diagram of the power source device of this example. Configurations in FIG. 2 identical to those of FIG. 7 are assigned with identical symbols, and the description thereof is omitted. In this example, to detect the present intermittent switching operation period, the BOTTOM terminal voltage of the power source IC 101 is input as a period detection signal into a buffer circuit including resistor 301, resistor 302 and an operational amplifier 303. The period detection signal passing through the buffer circuit is input into an intermittent period-voltage conversion circuit (detection unit), which is an intermittent operation period detector and includes a capacitor 304, diodes 305 and 306, resistors 308 and 310, an operational amplifier 309 and a capacitor 307. In the intermittent period-voltage conversion circuit, electric charges are accumulated in the capacitor 307 while the signal voltage input from the buffer circuit is changed in the negative direction. The shorter the intermittent period, the more the voltage to be output increases. Thus, the intermittent period-voltage conversion circuit converts information regarding the period of the transformer 103 that is input from the buffer circuit, into a voltage, and outputs as a voltage Vb (B-point voltage in the diagram). The intermittent period-voltage conversion circuit outputs the voltage Vb to a reference voltage switch and a frequency-reference voltage comparator.

In the reference voltage switch, a comparator 313 compares a voltage Vb at a B point input from the intermittent period-voltage conversion circuit with a voltage Vc at a C point divided by the resistors 311 and 312. The voltage Vc (a voltage corresponding to a prescribed period) is set to a voltage level in the case of period-voltage conversion in an intermittent switching period corresponding to a frequency, for instance, the frequency of the midpoint, between the transformer vibration frequencies F4 and F5' of the transformer 103, which is the region C in FIG. 1. In the case where the period of the period detection signal to be input is relatively long, that is, the voltage Vb input into the reference voltage switch is lower than the voltage Vc (Vb<Vc), the comparator 313 outputs a low level signal. The reference voltage switch includes a pull-up resistor 314, a current limiting resistor 315 and a reference voltage switching FET 316. The reference voltage switching FET 316 is in an off state when the low level signal is input from the comparator 313, and the voltage divided by the resistors 318 and 319 becomes a D-point voltage. The divided voltage level at the D point at this time is set to a voltage level Vdf4 (first threshold) corresponding to the transformer vibration frequency F4 in FIG. 1. Meanwhile, in the case where the period of the period detection signal to be input is relatively short, that is, the case where the voltage Vb is higher than the voltage Vc, (Vb>Vc), the comparator 313 outputs the high level signal, and the reference voltage switching FET 316 is in on state. The voltage divided by the resistors 317, 318 and 319 then becomes the D-point voltage. The divided voltage level at the D point at this time is set to a voltage level Vdf5' (second threshold) corresponding to the transformer vibration frequency F5' in FIG. 1. The D-point voltage in the reference voltage switch is output to the frequency-reference voltage comparator.

The frequency-reference voltage comparator includes a comparator 321, a pull-up resistor 322 and a current limiting resistor 323. In the frequency-reference voltage comparator, the comparator 321 compares the voltage Vb according to the present intermittent switching operation period input from the intermittent period-voltage conversion circuit with the D-point voltage input from the reference voltage switch, and the frequency-reference voltage comparator outputs the low level signal or the high level signal. The E-point voltage is a voltage output from the frequency-reference voltage comparator. The voltage (D-point voltage) input from the reference voltage switch into the frequency-reference voltage comparator is the voltage Vdf4 in the case of Vb<Vc, and is the voltage Vdf5' in the case of Vb>Vc, as described above.

An intermittent switching period switching FET 325 (period switching unit) is turned off in the case where the signal input from the frequency-reference voltage comparator is at the low level, thereby turning off a relay switch 326, which is an FB terminal current switching relay. In contrast, the intermittent switching period switching FET 325 is turned on in the case where the signal input from the frequency-reference voltage comparator is at the high level, thereby turning on the relay switch 326. A charging capacitor 324, a current limiting resistor 327, and an FB terminal current switching resistor 328 are illustrated.

(Switching Control of Intermittent Switching Period)

Figure 3:
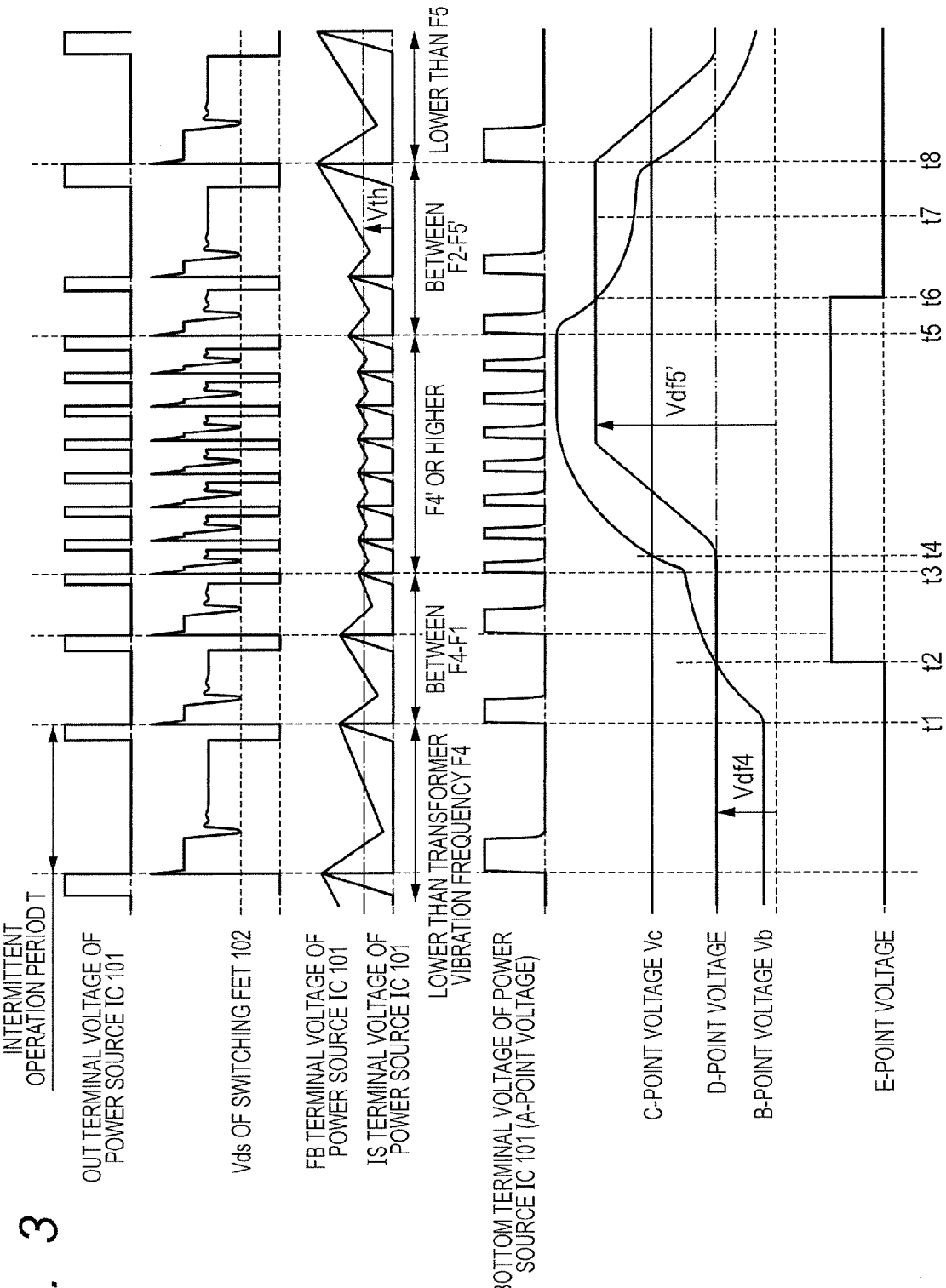
FIG. 3 illustrates an overview of an operation waveform on intermittent operation period switching of Example 1.

An operation of switching the intermittent switching period in the above configuration is described using the operation waveform. FIG. 3 illustrates operation waveforms representing situations of switching the intermittent switching period in the case where, in the intermittent switching operation, the transformer vibration frequency is changed from a transformer vibration frequency less than F4, to a transformer vibration frequency between F4 and F1, to a transformer vibration frequency equal to or higher than F4', to a transformer vibration frequency between F2 and F5' and to a transformer vibration frequency less than F5. That is, FIG. 3 is an operation waveform diagram in the case of transition of the state of the device from a state under light load to a state under a normal load, and subsequent transition from a state under the normal load to a state under the light load. FIG. 3 illustrates the OUT terminal voltage of the power source IC 101, Vds of the switching FET 102, the FB terminal voltage of the power source IC 101, the IS terminal voltage of the power source IC 101, the BOTTOM terminal voltage of the power source IC 101, the C-point voltage Vc, the D-point voltage, the B-point voltage Vb and the E-point voltage, in this order from the top. The BOTTOM terminal voltage of the power source IC 101 is the A-point voltage in FIG. 2.

Up to time t1, an intermittent switching operation where the transformer vibration frequency is less than F4 is performed. The period of the intermittent switching operation is set to the intermittent operation period T. On time t1, the D-point voltage is Vdf4 because Vb<Vc. In the case where the transformer vibration frequency of the transformer 103 is less than F4, Vb<Vdf4 holds and the comparator 321 of the frequency-reference voltage comparator outputs the low level (E-point voltage). Accordingly, the intermittent switching period switching FET 325 is turned off, and the intermittent switching operation according to the detected intermittent switching period is performed.

When time t1 has elapsed, the transformer vibration frequency approaches F4 and the intermittent switching period is reduced. Accordingly, the voltage Vb is increased. After Vb=Vdf4 on the time t2, Vb>Vdf4. As a result, on the time t2, the comparator 321 becomes an open output state, the E-point voltage becomes the high level, the intermittent switching period switching FET 325 in FIG. 2 is turned on, and the relay switch 326 is turned on. After the relay switch is turned on, the time constant determined by the current limiting resistor 110, the FB terminal current switching resistor 328 and the capacitor 109 is reduced in comparison with the case where the relay switch 326 is off. Thus, the response time of current drawn to the photocoupler 108 is reduced. Accordingly, the time in which the FB terminal voltage exceeds the pulse stop voltage Vth is reduced, and the time of reaching the next peak value is reduced. The period of the intermittent switching operation is therefore reduced. On the time t3, the transformer vibration frequency is switched from F4 to F4', and transition occurs to the region B in FIG. 1. That is, on the time t2, frequency switching control is performed, and, on the time t3, the frequency switching is reflected.

After the transformer vibration frequency is switched to a frequency equal to or higher than F4', the intermittent period-voltage conversion circuit further increases the voltage Vb. After Vb=Vc on the time t4, Vb>Vc holds and the reference voltage switching FET 316 is turned on. Accordingly, the D-point voltage is increased to Vdf5' with a time constant determined by the resistor 319 and the capacitor 320.

On the time t5, the load 211 on the secondary side is reduced, and the transformer vibration frequency is caused to approach F5'. The voltage Vb then gradually decreases. After Vb=Vdf5' on the time t6, Vb<Vdf5'. As a result, on the time t6, the output of the comparator 321 becomes the low level, and the E-point voltage becomes the low level, the intermittent switching period switching FET 325 is turned off, and the relay switch 326 is turned off. After the relay switch 326 is turned off, the response time to a peak value of the FB terminal voltage is increased in comparison with the case where the relay switch 326 is on. Accordingly, the period of the intermittent switching operation is increased, and the transformer vibration frequency is switched from F5' to a frequency lower than F5 on the time t8. That is, on the time t6, the frequency switching control is performed, and the frequency switching is reflected on the time t8. On the time t7, Vc<Vb<Vdf5'. After Vb=Vc on the time t8, Vb<Vc holds and the reference voltage switching FET 316 is turned off. Accordingly, the D-point voltage is reduced to Vdf4 again with the time constant.

In this example, on the time t2 (Vb=Vdf4) and the time t6 (Vb=Vdf5'), the frequency switching control is performed. On the time t4 (Vb=Vc) and the time t8 (Vb=Vc), to include hysteresis characteristics for preventing oscillation before and after frequency switching due to variation in load on the secondary side, the D-point voltage is switched.

In this example, the value of the reference voltage D-point voltage is set to two values (Vdf4 and Vdf5') for comparison with the output port B point of the intermittent period-voltage conversion circuit. When the transformer vibration frequency is switched from the low frequency to the high frequency, the voltage is set to Vdf4. When the frequency is switched from the high frequency to the low frequency, the voltage is set to Vdf5'. Thus, hysteresis characteristics are included between the secondary load and the vibration frequency before and after switching the vibration frequency, thereby preventing oscillation before and after switching the intermittent switching period.

This example has been described where the BOTTOM terminal voltage of the power source IC 101 is selected as the period detection signal, and switching of the resistor value connected to the FB terminal is selected as the period switching unit of the intermittent operation period. However, the adaptive range of the present invention is not limited. The period detection signal may be any of lines on which the intermittent switching operation is performed. More specifically, there are the following five cases.

(a) the primary auxiliary winding voltage of the transformer 103 (the BOTTOM terminal voltage of the power source IC 101)

(b) the on-off control signal of the switching FET 102 (the OUT terminal voltage of the power source IC 101)

(c) the drain current Id of the switching FET 102 (the IS terminal voltage of the power source IC 101)

(d) the FB terminal voltage of the power source IC 101

(e) the secondary winding voltage of the transformer 103

There are the following six cases regarding the period switching unit of the intermittent operation period.

(f) switching of the resistor value of the FB terminal line of the power source IC 101

(g) switching of the capacitance of capacitor for charging on the FB terminal line of the power source IC 101

(h) gain switching of the secondary feedback circuit (i) switching of the FB current inside an IC of the power source IC 101

(j) switching of the pulse width of the OUT terminal voltage determined inside the IC of the power source IC 101

(k) switching of the FB terminal reference voltage inside the IC of the power source IC 101 (switching of the pulse stop voltage Vth)

Thus, at least one of period detection signals (a) to (e) is detected by the intermittent period detection unit, and switching of the intermittent switching period is realized using at least one of the period switching units (f) to (k) of the intermittent operation period.

In this example, in a process of transition from the switching frequency under the normal load to a target switching frequency under the light load, the frequency switching control is performed such that the vibration frequency (the region C in FIG. 1) where beat sound occurs in the transformer is not reached. Likewise, in a process of transition from the switching frequency under the light load to the target switching frequency under the normal load, the frequency switching control is performed such that the vibration frequency (the region C in FIG. 1) where beat sound occurs in the transformer is not reached. Instead, frequency switching control may be performed such that the target frequency of the intermittent switching operation does not reach the vibration frequency where the transformer causes beat sound. The configuration of this example is not limited to that for reducing the power consumption. Instead, this configuration is applicable to the case of controlling the switching operation at low frequencies for another object. The applicability is also identical to that in the following examples.

As described above, according to this example, occurrence of the vibration noise of the transformer, which occurs in an intermittent switching operation, can be avoided, while reducing loss due to switching operation of the switching element.

Example 2

(Configuration of Power Source Device)

Figure 4A:
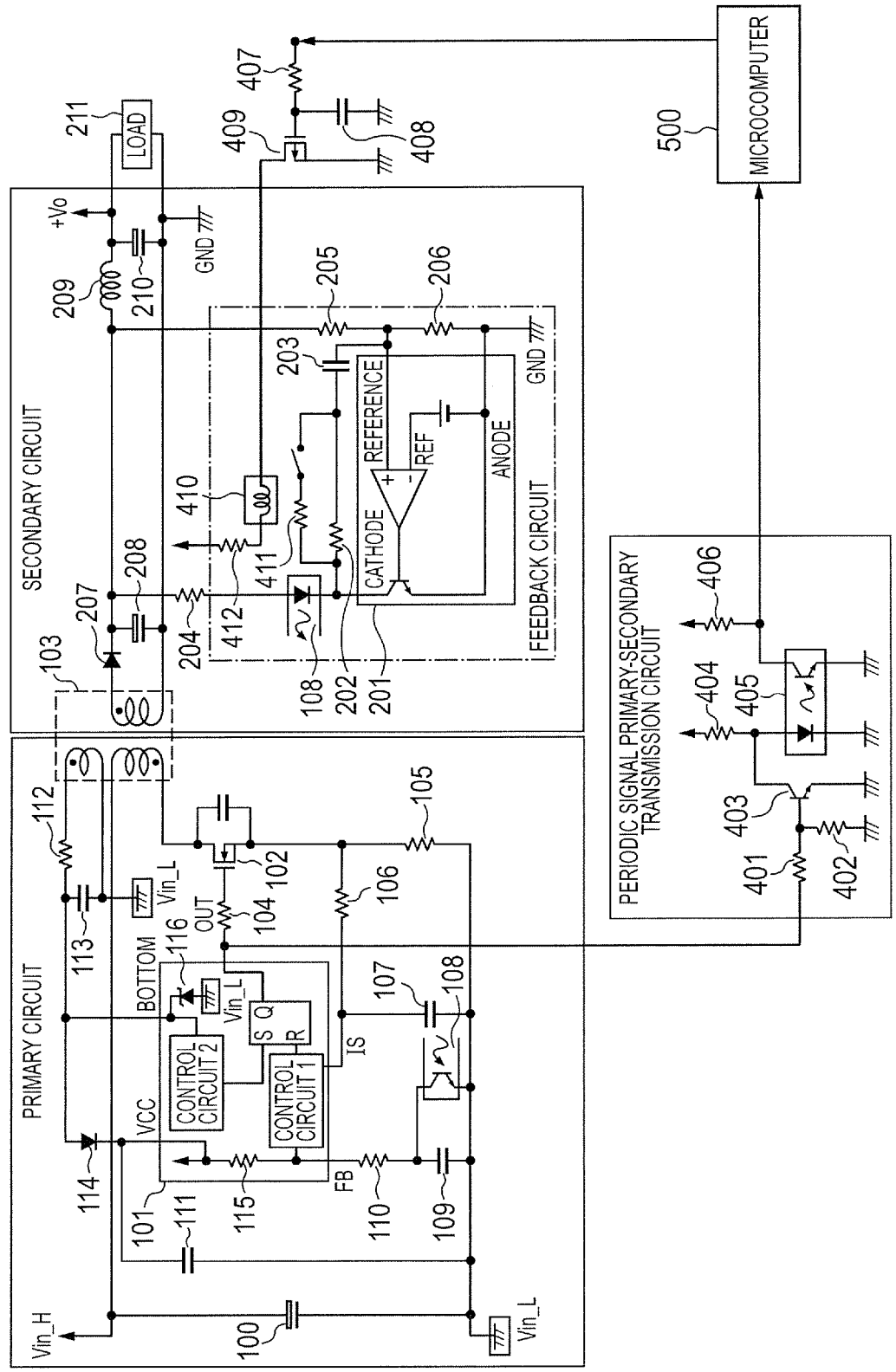
FIG. 4A is a schematic circuit diagram of a power source device of Example 2.

FIG. 4A illustrates a schematic circuit diagram of a power source device of Example 2. The configurations in FIG. 4A identical to those in FIG. 7 are assigned with the identical symbols. The description thereof is omitted. The OUT terminal voltage of the power source IC 101 is input as a period detection signal into a periodic signal primary-secondary transmission circuit including resistors 401, 402, 404 and 406, a transistor 403 and a photocoupler 405. The periodic signal primary-secondary transmission circuit turns on and off a transistor in the photocoupler 405 according to the input period detection signal, and then inputs an output signal into a microcomputer 500.

(Configuration of Microcomputer)

Figure 4B:
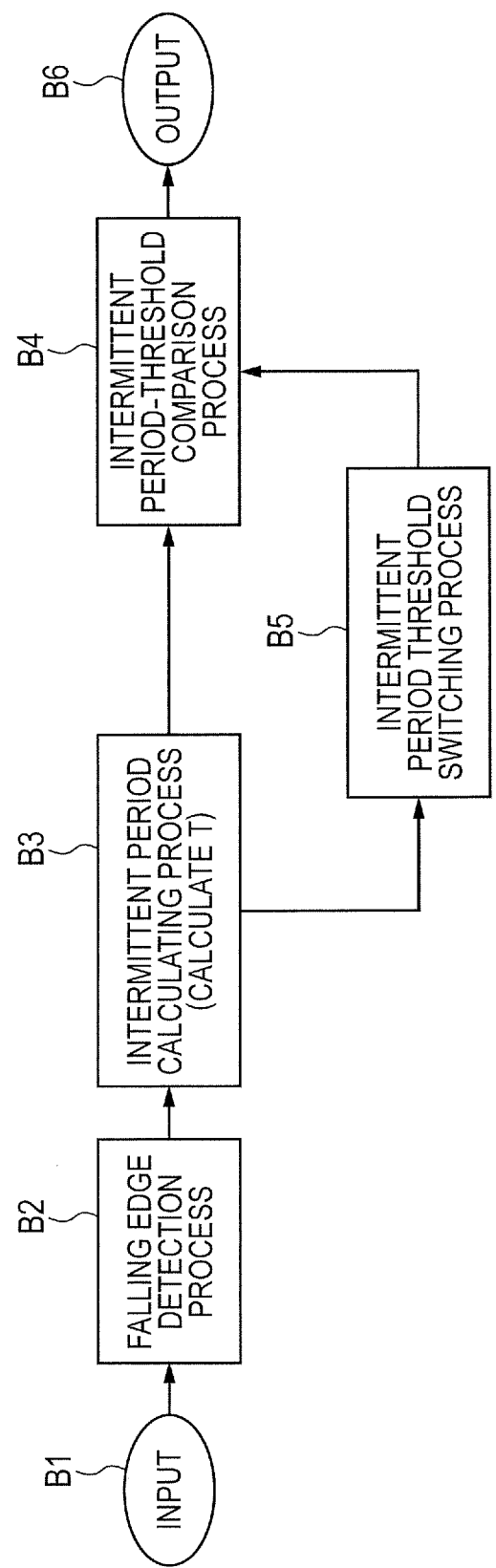
FIG. 4B is an internal operation block diagram of a microcomputer.

FIG. 4B is a schematic block diagram illustrating an operation in the microcomputer 500. The microcomputer 500 (detection unit) performs, for instance, a detection process B2 of a falling edge of an input signal B1 input from the periodic signal primary-secondary transmission circuit, and calculates the intermittent operation period T of the intermittent switching operation by an intermittent period process B3. More specifically, the microcomputer 500 causes a timer or a counter (not illustrated) to measure, for instance, a time from one falling edge to the next falling edge of the input signal B1, and calculates the intermittent operation period T. The microcomputer 500 performs an intermittent period threshold switching process B5 of switching the intermittent period threshold according to the calculated intermittent operation period T. The microcomputer 500 performs an intermittent period-threshold comparison process B4 to compare the intermittent operation period T calculated in the intermittent period calculating process B3 with the threshold switched in the intermittent period threshold switching process B5. The microcomputer 500 determines whether the level of an output signal B6 is to be a high level or a low level according to the comparison result of the intermittent period-threshold comparison process B4.

(Intermittent Period-Threshold Comparison Process)

The detailed process of the microcomputer 500 is described with reference to a flowchart illustrated in FIG. 5A. T4 (first threshold) and T5'(second threshold) illustrated in FIG. 5A indicate intermittent operation periods in the cases where the transformer vibration frequency of the transformer 103 illustrated in FIG. 1 is F4 and F5', respectively. Tc (prescribed period) is, for instance, a midpoint period of T4 and T5'. When the input signal B1 is input from the periodic signal primary-secondary transmission circuit, the microcomputer 500 starts a process. More specifically, the microcomputer 500 performs, for instance, the falling edge detection process B2 of detecting a timing when the input signal B1 input from the periodic signal primary-secondary transmission circuit falls from the high level to the low level. The microcomputer 500 then performs the intermittent period calculating process B3 to calculate the intermittent operation period T of the transformer 103 based on the result of the falling edge detection process B2. In S2, the microcomputer 500 performs the intermittent period threshold switching process B5 to compare the intermittent operation period T calculated in S1 with Tc. That is, the microcomputer 500 determines whether the intermittent operation period T is larger than Tc or not (longer or not).

If the microcomputer 500 determines that the calculated intermittent operation period T is larger than Tc in S2, this microcomputer sets the intermittent period threshold to T4 in S3. In S4, the microcomputer 500 performs the intermittent period-threshold comparison process B4 to compare the intermittent operation period T with the threshold T4. That is, the microcomputer 500 determines whether the intermittent operation period T is larger than the threshold T4 or not. If the microcomputer 500 determines that the calculated intermittent operation period T is larger than the threshold T4 in S4, this microcomputer outputs a signal in the low level (illustrated as Lo) as the output signal B6 in S5. If the microcomputer 500 determines that the calculated intermittent operation period T is equal to or less than the threshold T4 in S4, this microcomputer outputs a signal at the high level (illustrated as Hi) as the output signal B6 in S8.

If the microcomputer 500 determines that the calculated intermittent operation period T is equal to or less than Tc according to the intermittent period threshold switching process B5 in S2, the microcomputer 500 sets the intermittent period threshold to T5' in S6. In S7, the microcomputer 500 performs the intermittent period-threshold comparison process B4 to compare the calculated intermittent operation period T with the threshold T5'. If the microcomputer 500 determines that the calculated intermittent operation period T is smaller than the threshold T5' in S7, the microcomputer 500 outputs the high level signal in S8. If the microcomputer 500 determines that the calculated intermittent operation period T is equal to or larger than the threshold T5' in S7, the microcomputer 500 outputs the low level signal in S9. The microcomputer 500 repeats the above processes.

Figure 5A:
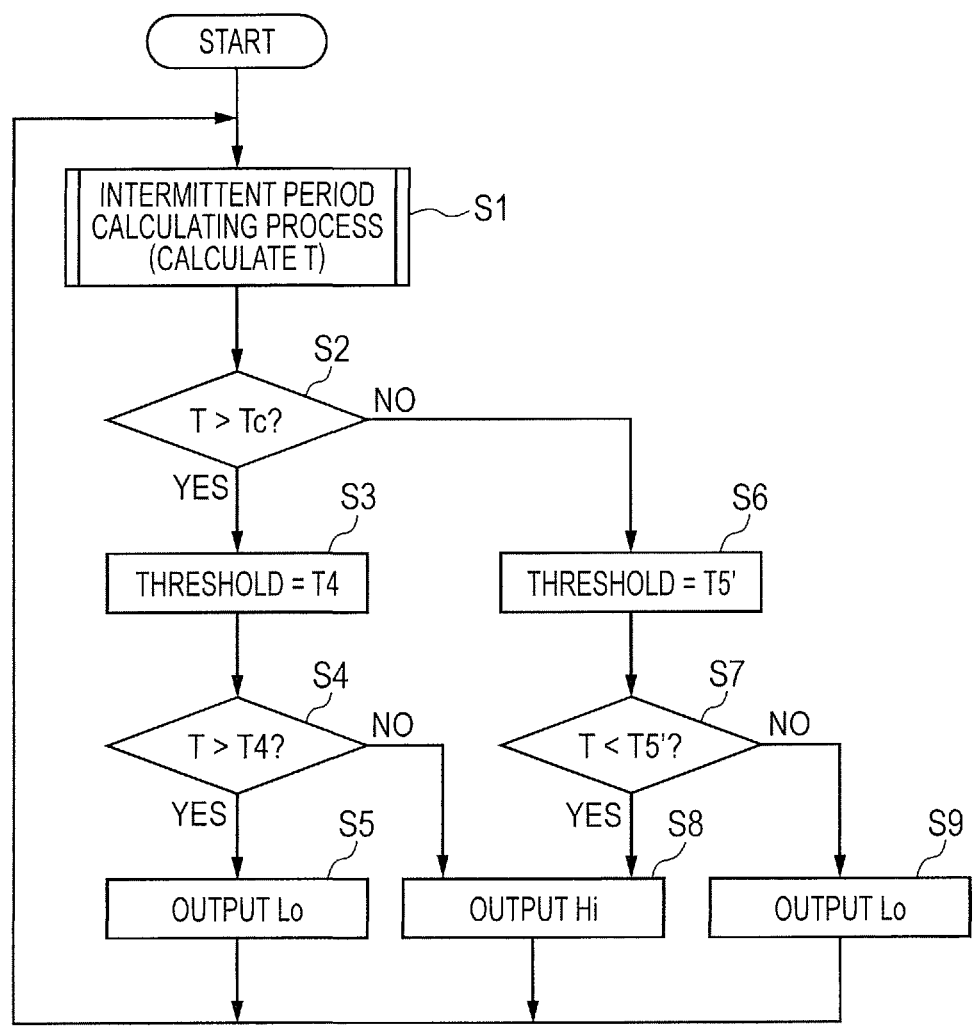
FIG. 5A is a flowchart illustrating an operation of the microcomputer of Example 2.

The processes in S2, S3 and S6 in FIG. 5A correspond to the intermittent period threshold switching process B5 in FIG. 4B. The processes S4, S5 and S7 to S9 correspond to the intermittent period-threshold comparison process B4 in FIG. 4B.

(Switching Intermittent Operation Period)

In FIG. 4A, when the low level signal is output from the microcomputer 500 (the cases of S5 and S9 in FIG. 5A), the intermittent switching period switching FET 409 is turned off and the relay switch 410, which is a feedback gain switching relay, is turned on. After the relay switch is turned on, the resistor value is reduced in comparison with the case where the relay switch is off because the resistor 202 and the feedback gain switching resistor 411 are connected in parallel to each other, thereby increasing the feedback gain. Accordingly, the response time in which the FB terminal voltage of the power source IC 101 exceeds the pulse stop voltage Vth is increased. Thus, the intermittent operation period T of the intermittent switching operation is increased, and the transformer vibration frequency becomes low. When the high level signal is output from the microcomputer 500, the intermittent switching period switching FET 409 is turned on, the relay switch 410 is turned off and the feedback gain is reduced. Thus, the intermittent operation period T is shortened, and the transformer vibration frequency becomes high. Based on the above configuration, the intermittent operation period T is switched, and the transformer vibration frequency in the region F1-F2 in the light load intermittent operation (the region C in FIG. 1) is avoided, which in turn avoids beat sound of the transformer 103. Current limiting resistors 407 and 412 and a charging capacitor 408 are illustrated.

In this example, the threshold of the period to be compared with the intermittent operation period T calculated by the microcomputer 500 is set to two values (T4 and T5'). Thus, in the case of switching the transformer vibration frequency from the low frequency to the high frequency, it is set such that switching is performed when the period becomes shorter than the switching period T4. In the case of switching from the high frequency to the low frequency, it is set such that switching is performed when the period becomes longer than T5'. Thus, hysteresis characteristics are included between the secondary load and the vibration frequency before and after switching the vibration frequency, thereby preventing oscillation before and after switching the intermittent switching period due to variation in load.

In this example, description has been made where the OUT terminal voltage of the power source IC 101 is selected as the period detection signal, and gain switching of the secondary feedback circuit is selected as the period switching unit of the intermittent operation period. However, as with Example 1, the adaptive range of the present invention is not limited. More specifically, at least one of the intermittent period signals (a) to (e) described in Example 1 is detected by the intermittent period detection unit. Switching of the intermittent switching period is realized using at least one of the period switching units of the intermittent operation periods (f) to (k) described in Example 1. In the case of the configuration in this example, the circuit scale can be configured smaller than that of Example 1.

As described above, according to this example, occurrence of the vibration noise of the transformer, which occurs in an intermittent switching operation, can be avoided, while reducing loss due to switching operation of the switching element.

Example 3

(Block Diagram of Power Source IC)

Figure 5B:
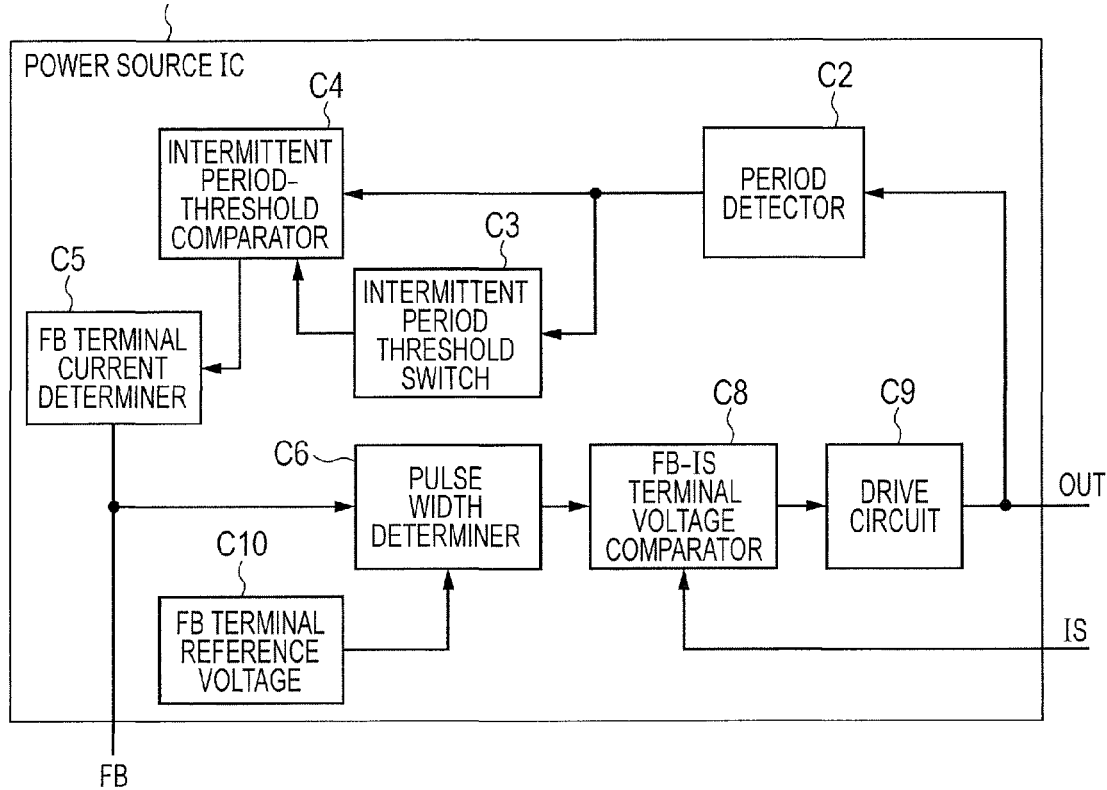
FIG. 5B is a schematic block diagram of a power source IC of Example 3.

FIG. 5B is a schematic block diagram of a power source IC 101 in Example 3. In this example, switching of the intermittent operation period is completed in the power source IC 101. The power source IC 101 (detection unit) inputs the OUT terminal signal output from the output port of a drive circuit C9 into a period detector C2 to detect the intermittent operation period. The detection result of the period detector C2 is output to an intermittent period threshold switch C3 and an intermittent period-threshold comparator C4. The intermittent period threshold switch C3 switches the intermittent period threshold based on the detection result of the intermittent operation period input from the period detector C2. The intermittent period-threshold comparator C4 compares the intermittent operation period detected by the period detector C2 with the intermittent period threshold determined by the intermittent period threshold switch C3, and outputs the comparison result to an FB terminal current determiner C5. The FB terminal current determiner C5 determines the FB terminal current value according to the comparison result input from the intermittent period-threshold comparator C4, and outputs the determined FB terminal current value to a pulse width determiner C6.

The FB terminal current value determined by the FB terminal current determiner C5, and an FB terminal reference voltage C10, which is the pulse stop voltage Vth, are input into the pulse width determiner C6. The pulse width determiner C6 compares the voltage according to the FB terminal current value determined by the FB terminal current determiner C5 with the FB terminal reference voltage C10, determines the on time of the OUT terminal signal based on the comparison result, and outputs the FB terminal voltage and the on time to an FB and IS terminal voltages comparator C8. The FB and IS terminal voltages comparator C8 voltages compares the FB terminal voltage input from the pulse width determiner C6 with the IS terminal voltage, and outputs the comparison result to the drive circuit C9. When the drive circuit C9 determines that each voltage becomes equal from the comparison result input from the FB and IS terminal voltages comparator C8, this circuit outputs the low level signal and turns off the switching FET 102 connected to the OUT terminal.

The higher the current value determined by the FB terminal current determiner C5, the shorter the response time of current drawn to the photocoupler 108 becomes. Accordingly, the time in which the FB terminal voltage exceeds the pulse stop voltage Vth is reduced, and the time of reaching the next peak value is reduced. Accordingly, the intermittent operation period is reduced. In FIG. 1, provided that the setting of FB terminal current value in the case of the transformer vibration frequency-load characteristic 1 is Ifb1 and the setting of FB terminal current value in the case of the transformer vibration frequency-load characteristic 2 is Ifb2, the relationship in magnitude of current values is Ifb1<Ifb2.

Switching conditions of the FB terminal current value is described using the intermittent operation periods T4, T5' and Tc defined in Example 2. In the case where the period detected by the period detector C2 satisfies the following conditions based on the comparison by the intermittent period-threshold comparator C4, the FB terminal current determiner C5 of the power source IC 101 determines the current value as follows. That is, in the case where the period detected by the period detector C2 is T>T4 (corresponding to S5 in FIG. 5A) or T5'≤T≤Tc (corresponding to S9 in FIG. 5A), the current value Ifb1 is determined (selected) as an FB terminal current value. The "OUTPUT Lo" in S5 and S9 in FIG. 5A corresponds to the current value Ifb1 of this example. Meanwhile, in the case where the period detected by the period detector C2 satisfies the following conditions based on the comparison by the intermittent period-threshold comparator C4, the FB terminal current determiner C5 of the power source IC 101 determines the current value as follows. That is, in the case where the period detected by the period detector C2 is Tc<T≤T4, or T<T5' (corresponding to S8 in FIG. 5A), the current value Ifb2 is determined (selected) as an FB terminal current value. The "OUTPUT Hi" in S8 in FIG. 5A corresponds to the current value Ifb2 in this example. Based on the above configuration, the intermittent operation period is switched by switching the FB terminal current value to avoid the transformer vibration frequency between F1-F2 in the light load intermittent operation, thereby avoiding beat sound of the transformer.

In this example, the threshold of the period to be compared with the detected intermittent operation period T is set to two values by the intermittent period threshold switch C3. Accordingly, in the case of switching the transformer vibration frequency from the low frequency to the high frequency, it is set such that switching is performed when the period becomes shorter than the switching period T4. In the case of switching from the high frequency to the low frequency, it is set such that switching is performed when the period becomes longer than T5'. Hysteresis characteristics are thus included between the secondary load and the vibration frequency before and after switching the vibration frequency, thereby preventing oscillation before and after switching the intermittent switching period due to variation in the load 211.

In this example, description has been made where the OUT terminal voltage of the power source IC 101 is selected as the period detection signal and switching of the FB terminal current is selected as the period switching unit of the intermittent operation period. However, as with Example 1, the adaptive range of the present invention is not limited. More specifically, at least one of the period detection signals (a) to (d) described in Example 1 is detected by the intermittent period detection unit. The switching of the intermittent switching period is realized using at least one of the period switching units of the intermittent operation period (i) to (k) in Example 1.

In this example, switching of the intermittent operation period is completed in the power source IC 101. Accordingly, no external circuit is required around the IC in comparison with Examples 1 and 2. This configuration does not require enhancing the external circuit, and allows variation to be reduced.

As described above, according to this example, occurrence of the vibration noise of the transformer, which occurs in an intermittent switching operation, can be avoided, while reducing loss due to switching operation of the switching element.

Example 4

The power source devices described in Examples 1 to 3 are applicable as, for instance, the low voltage power source of the image forming apparatus, that is, a power source supplying power to driving section, such as a controller and a motor. The configuration of the image forming apparatus to which the power source device in Examples 1 to 3 is applied is described hereinafter.

(Configuration of Image Forming Apparatus)

Figure 6:
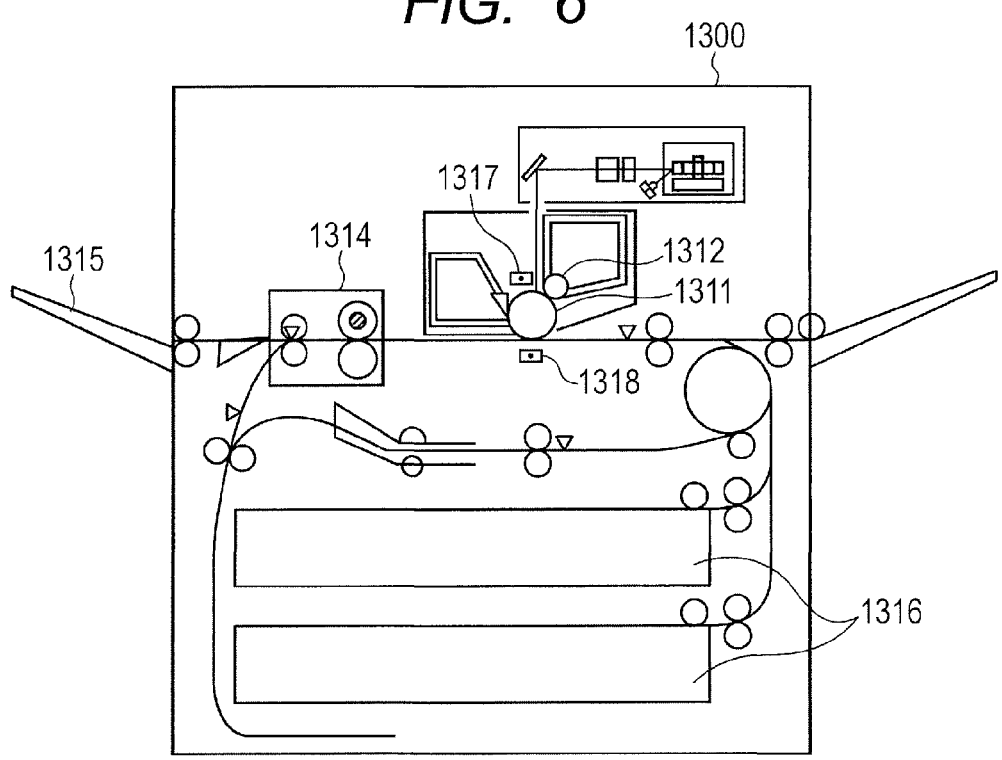
FIG. 6 is a schematic configuration diagram of an image forming apparatus of Example 4.

Description is made exemplifying the laser beam printer as an example of the image forming apparatus. FIG. 6 illustrates a schematic configuration of a laser beam printer, which is an example of an electrophotographic printer. The laser beam printer 1300 includes a photosensitive drum 1311 (image bearing member) on which the electrostatic latent image is formed, a charger 1317 (charging unit) uniformly charging the photosensitive drum 1311, and a developing section 1312 (developing unit) developing an electrostatic latent image on the photosensitive drum 1311 with toner. The toner image developed on the photosensitive drum 1311 is transferred to a sheet (not illustrated), as a recording medium supplied from a cassette 1316, by a transfer section 1318 (transfer unit). The toner image transferred on the sheet is fixed by a fixing device 1314, and the sheet is discharged onto the tray 1315. The photosensitive drum 1311, the charger 1317, the developing section 1312 and the transfer section 1318 are an image forming section. The laser beam printer 1300 includes a power source device described in Examples 1 to 3 (not illustrated in FIG. 6). The image forming apparatus to which any of the power source devices in Examples 1 to 3 is applicable is not limited to the apparatus exemplified in FIG. 6. For instance, the apparatus may be an image forming apparatus including a plurality of image forming sections. Furthermore, the apparatus may be an image forming apparatus including the primary transfer section transferring the toner image on the photosensitive drum 1311 onto the intermediate transfer belt, and a secondary transfer section transferring the toner image on the intermediate transfer belt onto the sheet.

The laser beam printer 1300 includes a controller (not illustrated) that controls an image forming operation by the image forming section and an operation of transferring a sheet. For instance, the power source device described in Examples 1 to 3 supplies power to the controller. The power source device described in Examples 1 to 3 supplies power to a driving section, such as a motor, for rotating the photosensitive drum 1311, driving various rollers transferring a sheet, or the like. That is, the load 211 in Examples 1 to 3 corresponds to the controller or the driving section. In the case of a waiting state realizing a power-saving state (e.g., in one of the power saving mode and the waiting mode), the image forming apparatus in this example reduces the load, e.g., supply power only to the controller, thereby allowing the power consumption to be reduced. That is, in the image forming apparatus in this example, the power source device described in Examples 1 to 3 performs the intermittent switching operation in the power saving mode. In the image forming apparatus, during operation in the power saving mode, the configuration described in Examples 1 to 3 performs control such that the transformer vibration frequency of the transformer 103 of the power source device is not between the transformer vibration frequencies F1-F2 described in FIG. 1.

As described above, according to this example, occurrence of the vibration noise of the transformer, which occurs in an intermittent switching operation, can be avoided, while reducing loss due to switching operation of the switching element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053526, filed Mar. 9, 2012, which is hereby incorporated by reference herein in its entirety.

What is claimed is:

1. A power source device comprising:
   a transformer;
   a switching unit constructed to drive a primary side of the transformer;
   a controller constructed to control a switching frequency for the switching unit and to control an output from a secondary side of the transformer; and
   a detector constructed to detect the switching frequency
   wherein, based on a result detected by the detector, the controller controls to switch the switching frequency, so that the output from the secondary side is a prescribed value, from a first frequency lower than a lower limit of an audible frequency range to a second frequency higher than an upper limit of the audible frequency range, or from the second frequency to the first frequency.

2. The power source device according to claim 1, further comprising
   a threshold switch switching unit constructed to switch a threshold of the switching frequency between a first threshold lower than the lower limit of the audible frequency range and a second threshold higher than the upper limit of the audible frequency range according to the switching frequency detected by the detector.

3. The power source device according to claim 2,
   wherein, when the frequency detected by the detector is lower than a prescribed frequency, the threshold switching unit adopts the first threshold as the threshold, and, when the frequency detected by the detector is higher than the prescribed frequency, the threshold switching unit adopts the second threshold different from the first threshold as the threshold.

4. The power source device according to claim 1, further comprising
   a feedback section constructed to output information relating to an output on the secondary side of the transformer, to the controller via a resistor; and
   a frequency switching unit constructed to switch the switching frequency by switching a resistor value of the resistor.

5. The power source device according to claim 1, further comprising:
  a feedback section constructed to output information relating to an output on the secondary side of the transformer, to the controller via a capacitor; and
  a frequency switching unit constructed to switch the switching frequency by switching capacitance of the capacitor.

6. The power source device according to claim 1, further comprising:
  a feedback section constructed to output information relating to an output on the secondary side of the transformer to the controller; and
  a frequency switching unit constructed to switch the switching frequency by switching a feedback gain of the feedback section.

7. The power source device according to claim 1, further comprising:
  a feedback section constructed to output information relating to an output on the secondary side of the transformer to the controller, wherein the controller comprises a terminal where information is input from the feedback section; and
  a frequency switching unit constructed to switch the switching frequency by switching a value of current flowing to the terminal.

8. The power source device according to claim 1,
  wherein the controller controls an operation of driving the switching unit by outputting a pulse signal to the switching unit, and
  the controller controls a frequency switching unit so as to switch the switching frequency by switching a pulse width of the pulse signal.

9. The power source device according to claim 1, further comprising:
  a feedback section constructed to output a voltage according to an output on the secondary side of the transformer to the controller, wherein the controller controls an operation of driving the switching unit based on a result of comparison between a voltage output from the feedback section and a reference voltage; and
  a frequency switching unit constructed to switch the switching frequency by switching the reference voltage.

10. The power source device according to claim 1,
  wherein the controller controls the switching unit to perform a switching operation, in a power-saving state where a voltage output from the power source device is reduced.

11. An image forming apparatus, comprising:
  a controller controlling an image forming operation; and
  a power source supplying power to the controller, the power source comprising:
  a transformer insulating a primary side and a secondary side from each other;
  a switching unit constructed to drive the primary side of the transformer;
  a controller constructed to control a switching frequency for the switching unit, to control an output from the secondary side of the transformer;
  a detector constructed to detect the switching frequency; and
  wherein, based on a result detected by the detector, the controller controls to switch the switching frequency, so that the output from the secondary side is a prescribed value, from a first frequency lower than a lower limit of an audible frequency range to a second frequency higher than an upper limit of the audible frequency range, or from the second frequency to the first frequency.

12. The image forming apparatus according to claim 11, wherein, in a power-saving state where the image forming apparatus does not form an image, the controller of the power source controls the switching unit to perform a switching operation.

* * * * *